United States Patent [19]

Hills et al.

[11] Patent Number: 4,970,058
[45] Date of Patent: Nov. 13, 1990

[54] SODA ASH PEROXYGEN CARRIER

[75] Inventors: William A. Hills, Lawrenceville; Henry A. Pfeffer, Mercerville, both of N.J.

[73] Assignee: FMC Corporation, Philadelphia, Pa.

[21] Appl. No.: 253,822

[22] Filed: Oct. 6, 1988

[51] Int. Cl.$^5$ .............................................. C01B 15/10
[52] U.S. Cl. .................................. 423/415 P; 423/272; 252/186.27
[58] Field of Search .................... 423/415 P, 272; 252/186.27, 186.28, 186.29

[56] References Cited

U.S. PATENT DOCUMENTS

| | | | |
|---|---|---|---|
| 1,225,722 | 5/1917 | Schaidhauf | 423/415 P |
| 1,225,832 | 5/1917 | Liebknecht | 423/415 P |
| 1,669,997 | 5/1928 | Noll | 423/415 P |
| 1,950,320 | 3/1934 | Muller | 423/415 P |
| 2,167,997 | 8/1939 | Reichert | 23/62 |
| 2,254,434 | 9/1941 | Lind et al. | 252/95 |
| 2,380,620 | 7/1945 | Walters | 23/62 |
| 2,541,733 | 2/1951 | Young | 23/63 |
| 3,122,417 | 2/1964 | Blaser et al. | 23/207.5 |
| 3,387,939 | 6/1968 | Reilly et al. | 23/207.5 |
| 3,463,618 | 8/1969 | Harris et al. | 23/315 |
| 3,677,962 | 7/1972 | Yanush | 23/62 |
| 3,773,678 | 11/1973 | Munday | 252/186 |
| 3,801,706 | 4/1974 | Sack | 423/421 |
| 3,860,694 | 1/1975 | Jayawant | 423/415 P |
| 3,864,454 | 2/1975 | Pistor et al. | 423/415 P |
| 3,951,838 | 4/1976 | Jayawant et al. | 252/99 |
| 3,960,888 | 6/1976 | Ploger et al. | 423/415 P |
| 3,977,988 | 8/1976 | Tokiwa et al. | 252/99 |
| 3,979,318 | 9/1976 | Tokiwa et al. | 252/186 |
| 3,984,342 | 10/1976 | Hall et al. | 252/186 |
| 4,018,874 | 4/1977 | Mollard | 423/415 P |
| 4,020,148 | 4/1977 | Mohr et al. | 423/415 P |
| 4,025,609 | 5/1977 | Matsunaga | 423/415 P |
| 4,075,116 | 2/1978 | Mesaros | 252/102 |
| 4,118,465 | 10/1978 | Malafosse | 423/415 P |
| 4,131,562 | 12/1978 | Lutz et al. | 423/415 P |
| 4,146,571 | 3/1979 | Will et al. | 423/415 P |
| 4,171,280 | 10/1979 | Maddox et al. | 423/415 P |
| 4,279,769 | 6/1981 | Zagi et al. | 423/415 P |
| 4,388,287 | 6/1983 | Sugano et al. | 423/415 P |
| 4,409,197 | 10/1983 | Suagno et al. | 423/415 P |
| 4,526,698 | 7/1985 | Kuroda et al. | 252/99 |

FOREIGN PATENT DOCUMENTS

| | | | |
|---|---|---|---|
| 070711 | 1/1983 | European Pat. Off. | 423/415 P |
| 132570 | 10/1978 | German Democratic Rep. | 423/415 P |
| 140140 | 2/1980 | German Democratic Rep. | 423/415 P |
| 212947 | 8/1984 | German Democratic Rep. | 423/415 P |
| 213417 | 9/1984 | German Democratic Rep. | 423/415 P |
| 47-36636 | 9/1972 | Japan | 423/415 P |
| 60-11210 | 1/1985 | Japan | 423/415 P |

Primary Examiner—Gary P. Straub
Attorney, Agent, or Firm—R. E. Elden; R. L. Andersen

[57] ABSTRACT

A novel composition of matter is claimed comprising particles which appear to comprise sodium carbonate, sodium percarbonate (also called sodium carbonate peroxide or sodium carbonate perhydrate), and a stabilizer for the compound, preferably a diphosphonic acid, the sodium carbonate being present in sufficient quantity to form sodium carbonate monohydrate by reacting with the available water in the composition.

2 Claims, 3 Drawing Sheets

SODA ASH PEROXYGEN CARRIER

The present invention a solid composition of soda ash and hydrogen peroxide which has good storage stability and is useful to provide an alkaline peroxide solution when dissolved in water.

Sodium carbonate, also known as soda ash, is known to form at least two solid addition compounds with hydrogen peroxide, $2Na_2CO_3.3H_2O_2$ (sodium carbonate sesquiperoxide) and $2Na_2CO_3.3H_2O$ (sodium carbonate sesquiperoxide hydrate). Sodium carbonate sesquiperoxide commonly is known as sodium percarbonate and is also called sodium carbonate peroxide or sodium carbonate perhydrate, and is abbreviated herein as "SCP". SCP has been the subject of much study because of its many potential applications as a peroxygen source when dissolved in an aqueous solution. Although it has the advantages of a high active oxygen content (over 15%), high solubility in water, relatively cheap raw materials and very low adverse environmental impact, SCP has never achieved the commercial acceptance of sodium perborate.

However, SCP exhibits a drawback because it is much less stable than the perborate. Solid SCP undergoes decomposition, with a loss of active oxygen substantially greater than the decomposition of perborate under the same conditions. This problem is particularly undesirable in cartons of detergents sold at retail, during detergent processing or during storage following delivery to a detergent manufacturer. The elimination of impurities, such as heavy metals which catalyze the decomposition reaction, alleviates the instability of aqueous SCP solutions.

Numerous solutions have been proposed for alleviating this stability problem of solid SCP, but to date none have been entirely successful.

U.S. Pat. No. 2,380,620 discloses that sodium silicate, magnesium sulphate or gum arabic are unsatisfactory stabilizers when incorporated into the reaction mixture. The patent teaches that adding diphenylguanidine would lessen the decomposition, preferably in the presence of the conventional stabilizers.

U.S. Pat. No. 2,541,733 teaches a process for incorporating magnesium carbonate and a silicate into the SCP crystals during their formation in the mother liquor. U.S. Pat. No. 3,677,697 teaches adding a silicate and benzoic acid to the crystals prior to drying.

U.S. Pat. No. 3,951,838 discloses that prior attempts at chemical stabilization, primarily by magnesium silicate, are generally ineffective in promoting long term stability of SCP, particularly in a humid atmosphere. The patent instead teaches coating the particles with an aqueous silica sol and drying.

U.S. Pat. No. 3,977,988 to Fumikatsu et al. discloses coating SCP with paraffin, polyethylene glycol or sodium pyrophosphate to be impractical and suggests coating the particles with a film of a silicate and a silicofluoride. In U.S. Pat. No. 3,979,318 the same inventors teach coating SCP particles with a hydrophobic liquid.

U.S. Pat. No. 4,075,116 teaches cocrystallizing SCP with other salts known to form perhydrates such as sodium sulfate, sodium pyrophosphate, sodium glucoheptonate, sodium perborate and others.

U.S. Pat. No. 4,409,197 teaches incorporating an N,N,N',N'-tetra(phosphonomethyl)diaminoalkane into the reaction solution prior to crystallizing SCP.

U.S. Pat. No. 4,171,280 and 4,260,508 teach a noncaking bleach composition may be formed containing up to 6% active oxygen as SCP by spraying only sufficient hydrogen peroxide onto sodium carbonate to partially convert the sodium carbonate or sodium carbonate monohydrate to SCP. U.S. Pat. No. 4,260,508 teaches adding a sodium phosphate to the composition as a stabilizer. Both patents teach against producing a product containing more than 6% active oxygen and that an assay of less than 6% active oxygen (less than 40% SCP) is necessary to obtain satisfactory stability. The low assay also is critical to prevent caking and demixing or separating in formulations. However, such a low assay is a great disadvantage for detergent formulations because of the added shipping costs, the cost of the added inert raw materials and the increased capital cost because of the larger size equipment necessary to obtain desired throughput. Even more objectionable is that the low assay restricts the end use formulator to compositions containing less than 6% active oxygen.

The present invention overcomes the shortcomings of the prior art by providing a stabilized soda ash peroxygen carrier composition comprising a "particulate solid", said particulate solid comprising sodium carbonate, sodium carbonate perhydrate, and a stabilizing amount of a "stabilizer" for said composition, at least one mole of sodium carbonate being present in the composition for every mole of "available water" in the composition. A particularly desirably embodiment of the invention is a particulate solid comprising sodium carbonate, SCP and 0.1% to about 3% by weight of a diphosphonic acid or salt having a formula of

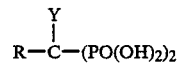

wherein Y is hydrogen or hydroxyl, R is hydrogen or an aliphatic hydrocarbon group having one to six carbons, sufficient sodium carbonate being present in the composition to provide between 1 and 5 moles of sodium carbonate for each mole of available water in the composition. One skilled in the art will recognize that an effective amount of a stabilizer will depend on the stabilizer selected.

It is critical to provide sufficient sodium carbonate in the composition to be able to combine with all of the available water in the composition to form sodium carbonate monohydrate; the term "available water" includes water chemically available as hydrogen peroxide, water of crystallization of sodium carbonate hydrates and free water which may temporarily exist in the composition.

As used herein, the term "particulate solid" ideally refers to particles all of which comprise sodium carbonate, SCP and stabilizer and excludes a physical mixture of separate particles of sodium carbonate and of SCP. However, such an ideal is not practical, particularly in compositions containing 5 moles of sodium carbonate per mole of available water. Desirably, a major proportion of the particles comprise sodium carbonate, SCP and stabilizers, preferably 90% of the particles comprise sodium carbonate, SCP and stabilizer.

Such a composition can be manufactured by contacting particles of anhydrous sodium carbonate with a limited amount of a solution of hydrogen peroxide containing the stabilizer and having a concentration of more than 70% thereby forming a mixture of SCP, sodium carbonate monohydrate and some unreacted anhydrous sodium carbonate contrary to the teaching of U.S. Pat. No. 4,171,280.

For example, one could contact particles of anhydrous sodium carbonate with a solution of a diphosphonic acid in a substantially anhydrous (100%) solution of hydrogen peroxide. More simply, one could employ the process of copending U.S. Application U.S. Application Ser. No. 254,063 filed Oct. 6, 1988.

Desirably, the assay of the composition will be between 45% and 75% by weight as SCP (between 14.6% and 24% as hydrogen peroxide or 7% and 10.6% active oxygen). Preferably the assay of the composition will be between 65% and 75% as SCP) between 21% and 24% $H_2 2$ or 9% and 10.6% active oxygen). Unless indicated otherwise, all percentages used herein are rounded off to the nearest whole number or significant figure.

Further, it was found that the compositions were useful as a solid and storage stable source of peroxygen when formulated into detergent compositions. The compositions assaying between 45% and 75% as SCP were found to be particularly useful compounds in detergent formulations.

Unexpectedly it was found that the compositions were stable without the need for the coatings required by the prior art. It was further unexpectedly found that the compositions did not cake on storage in humid atmospheres even though the assay of the compositions was 45% to 75% SCP, even when the vapor pressure of water was substantially greater than the equilibrium vapor pressure of sodium carbonate monohydrate.

BRIEF DESCRIPTION OF THE FIGS. FIG. 1, 2 and 3 are curves showing the thermal stability of the SAPC composition.

Figure 1:
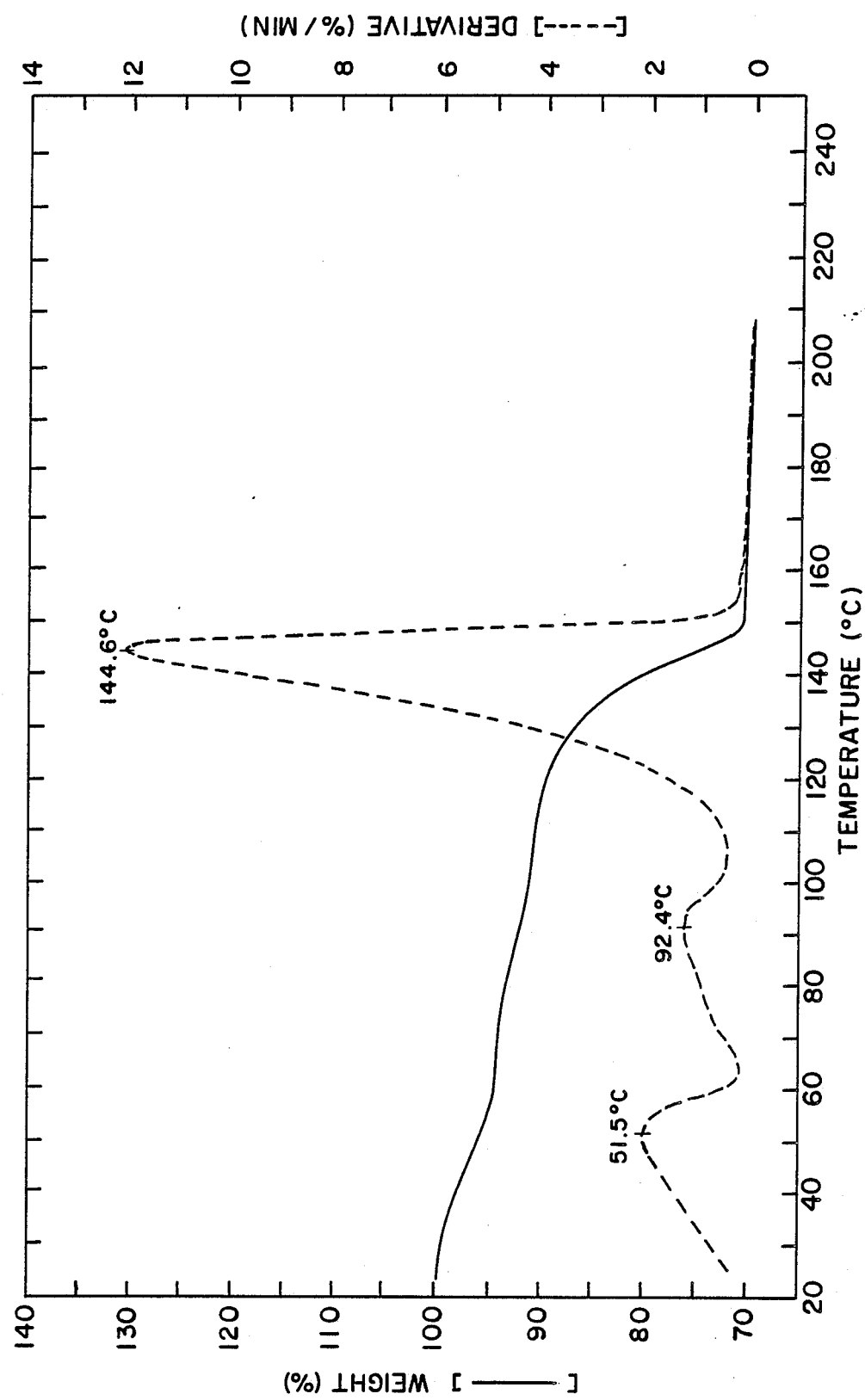
FIG. 1 is the thermogravimetirc anaylses (TGA) curves of a SAPC composition initially containing two types of water of hydration.

The incorporation of a "stabilizer" for the composition is critical to the invention. The stabilizer appears to do more than prevent decomposition of the composition; the stabilizer appears to change the physical properties of the composition as measured by the equilibrium vapor pressure of sodium carbonate monohydrate, as well as the active oxygen stability on storage. Clearly what "appears to be" sodium carbonate monohydrate and anhydrous sodium carbonate by the standard assays employed is an over-simplification. For the purpose of this invention we will describe the novel compositions as if they consisted of a simple mixture of SCP, anhydrous sodium carbonate, sodium carbonate monohydrate, sodium carbonate decahydrate and a stabilizer. For clarity the novel composition is called a "Soda Ash Peroxygen Carrier", or simply SAPC.

The scope of this invention is intended to include as stabilizers any additive which when added in an effective amount changes the physical properties of the composition. A particularly desirable diphosphonic acid is a 1-hydroxyalkyl-1,1-diphosphonic acid which is commercially available. A typical example is sold under the tradename Dequest 2010 brand of 1-hydroxy-ethylidene-1,1-diphosphonic acid by Monsanto Chemical Co. in St. Louis, Mo. Surprisingly, it was found that the diphosphonic acid or salt appears to modify equilibrium vapor pressure the sodium carbonate monohydrate crystal permitting its dehydration under very mild conditions compared with the published data. This is wholly unexpected in view of the fact that diphosphonic acid is hygroscopic. On the other hand, the excess of anhydrous sodium carbonate in the SAPC still appears to be able to remove water present as sodium carbonate decahydrate by forming sodium carbonate monohydrate.

Any standard analytic method may be employed to analyze the soda ash carrier composition as follows:

Sodium Carbonate or Total Alkalinity (TA) may be determined by titrating with a standardized to a methyl orange endpoint and reported as % $NaCO_3$ (sodium carbonate).

Active Oxygen (AO) may be determined by titrating with a standardized permanganate or ceric sulfate solution or determined iodometrically by titrating liberated iodine with standardized thiosulfate solution and alternatively reported as % AO, % $H_2O_2$, (2.125 $\times$ % AO) or % SCP (6.542 $\times$ % AO). The detailed procedures are conveniently described in FMC Corporation's Technical Bulletin 59, "The Analysis of Hydrogen Peroxide Solutions".

Water (% $H_2O$) may be determined conveniently by thermogravimetric analyses or by weight lost on standing over a dessicant at room temperature.

Available Water (% AW) can be determined gravimetrically by igniting a sample to about 200° C. in a gas stream and measuring the increase in weight of a suitable absorbant, such as magnesium perchlorate, in the gas stream. Available water may be estimated as AW = % $H_2O$ + 0.529 $\times$ % $H_2O_2$.

The following examples are presented to illustrate to one skilled in the art the best mode of practicing the invention and are not intended to be limiting. The stabilizers are exemplified in terms of the preferred commercial diphosphonic acid compound.

Laboratory samples of the SAPC were prepared by adding the desired quantity of a diphosphonic acid (if any) into 70% by weight hydrogen peroxide to form a mixed solution. Anhydrous sodium carbonate was introduced into a laboratory rotary evaporator equipped with a waterbath for temperature control unless otherwise stated. The desired quantity of mixed solution of hydrogen peroxide and 1-hydroxy-ethylidene-1,1-diphosphonic acid was sprayed onto the soda ash to form a reaction mixture while mixing to ensure homogeneity and concomitantly water vapor was removed by applying by vacuum or by urging air over the surface of the reaction mixture. After the desired quantity of mixed solution was sprayed the reaction mixture was removed as product.

The humidity chamber stability was determined by placing a sample in a crystallizing dish in a humidity chamber at 40° C. and 80% relative humidity. The percent hydrogen peroxide was determined by iodometric titration and recorded over ten days. No corrections were made for the amount of water absorbed or lost in the samples.

The stability was also confirmed by differential scanning calorimetry (DSC) and by thermal gravimetric analysis (TGA).

EXAMPLE 1

SAPC compositions with and without diphosphonic acid were prepared and their stability was determined in a humidity chamber (Table I). Soda ash mixtures with hydrogen peroxide alone were unstable at almost all composition levels, the higher the percent hydrogen peroxide the more unstable. When a diphosphonic acid was added along with the hydrogen peroxide, stable perhydrates were produced. Table I shows that stable compositions assaying from 55% to 75% SCP were made by this process. Compositions assaying more than 75% SCP (more than 25% $H_2O_2$) were unstable regardless of the presence of the diphosphonic acid.

EXAMPLE 2

The stability of a composition assaying 55% SCP (18% hydrogen peroxide) is summarized in Table II. Stability of an 18% hydrogen peroxide mixture toward storage at 50° C. and 40% relative humidity is shown in Table III. These data indicate that a product is produced that is stable towards storage at relatively high temperature and humidity. It is further seen that compositions made by this process are as stable as other peroxygens in commercial use—sodium perborate tetrahydrate and sodium perborate monohydrate and commercial SCP coated with silicates (Table IV).

EXAMPLE 3

Figure 2:
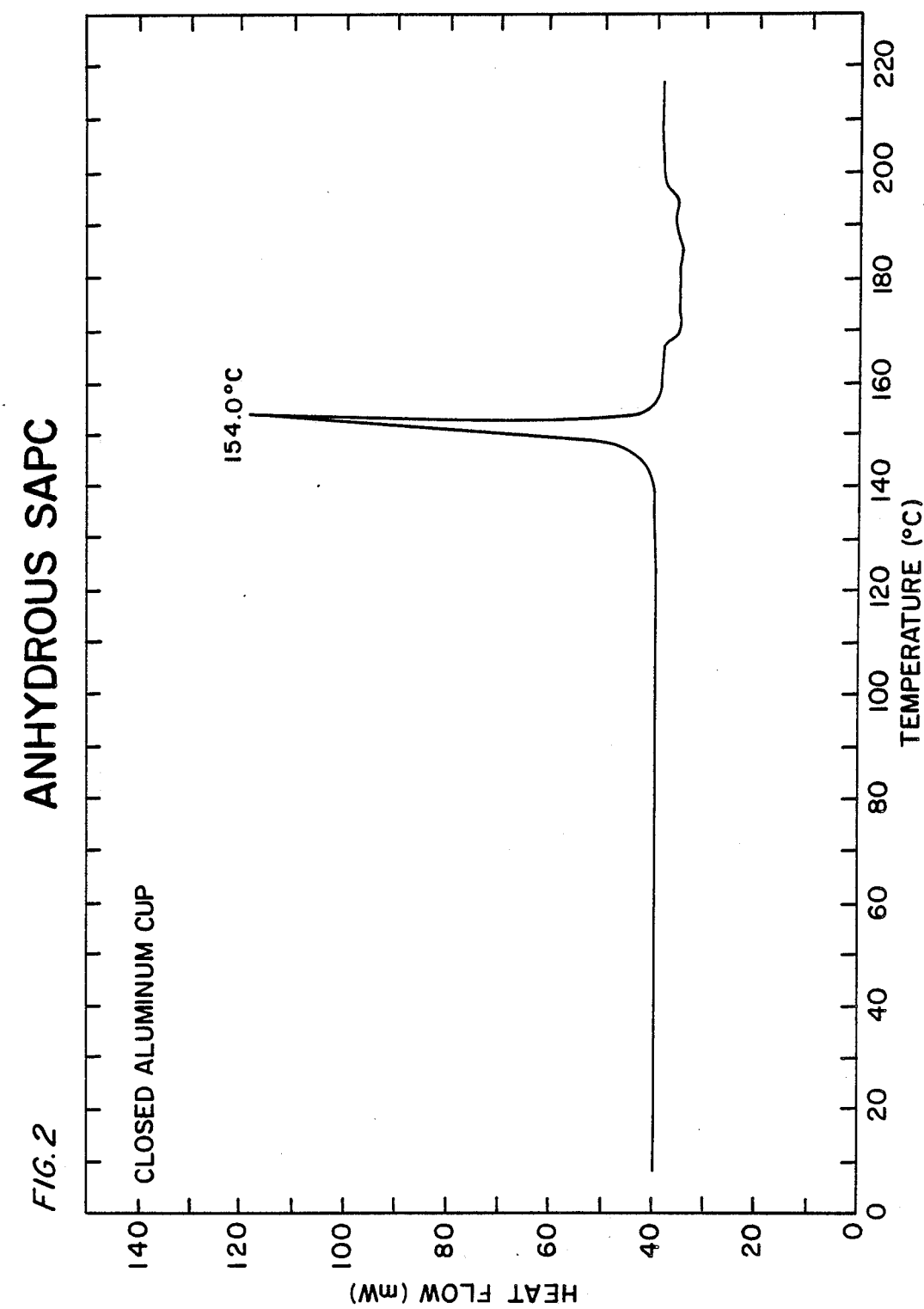
FIG. 2 is the differential thermal analysis (DTA) curve of anhydrous SAPC composition.
Figure 3:
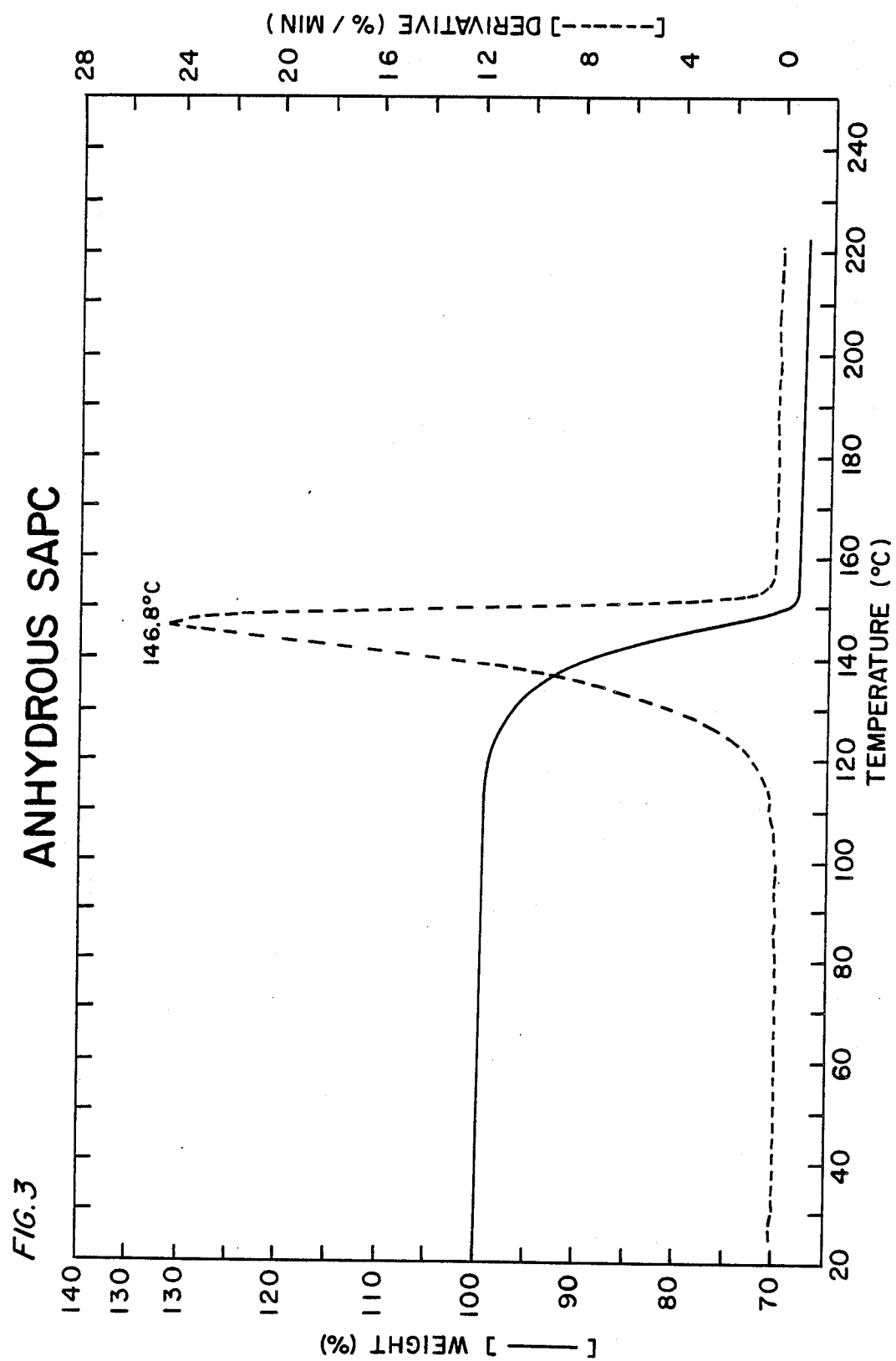
FIG. 3 is the TGA curves of the anhydrous SAPC of FIG. 2. These three figures are discussed in detail in Example 3.

The thermal stability of compositions assaying 55% SCP (18% hydrogen peroxide) was determined by thermal gravimetric analysis (TGA) and differential thermal analysis (DTA). These analyses show that compositions are stable up to approximately 150° C. The TGA analyses also show that two types of water of crystallization initially may exist in these compositions which superficially appear to be sodium carbonate decahydrate and sodium carbonate monohydrate (FIG. 1). The former is easy to remove or convert to the monohydrate (Table V). The monohydrate water is more difficult to remove. The presence of the monohydrate does not lead to severe caking as does the presence of the decahydrate. The diphosphonic acid surprisingly appears to modify the monohydrate crystal allowing water of crystallization to be removed thereby forming an almost anhydrous product. This is shown in the TGA and DSC analyses in FIGS. 2 and 3. This product is less likely to cake on contact with moderately humid environment.

Table V and FIG. 1 also show the unexpected properties of SAPC when compared with the published data for the vapor pressure of water at 40.4° C. over sodium carbonate monohydrate of 2.12 kPa (15.9 mm) compared with the vapor pressure of water at 40.5° C. and 80% relative humidity of 6.06 kPa (45.4 mm). According to the published data the sodium carbonate monohydrate formed in the SAPC should, but does not, absorb water from the atmosphere.

EXAMPLE 4

Diphosphonic acid is required for solution stability and SAPC stability as well as for ease of removal of water of hydration. Samples were prepared in a laboratory Hobart blender containing 0.2%, 0.7% and 1.3% diphosphonic acid. Table VI summarizes the effect of the diphosphonic acid additive on the stability of the composition. The amount of additive required is much higher than that required to simply stabilize the hydrogen peroxide by chelating heavy metals. The SAPC compositions were found as stable as commercial SCP (coated), sodium perborate monohydrate and sodium perborate tetrahydrate. This is shown in Table IV.

EXAMPLE 5

In addition to determining the stability of the soda ash/hydrogen peroxide composition as a function of hydrogen peroxide and moisture, the hydrogen peroxide uptake was determined as a function of particle size distribution of the soda ash. It was shown by Table VII that for a given hydrogen peroxide content the hydrogen peroxide content of the smaller particles was greater than that of the larger particles. The presence of fine particles containing a disproportionately high concentration of hydrogen peroxide appears to result in instability of the product.

EXAMPLE 6

A ribbon blender with a water jacket was used as the reaction vessel having a 0.15 m³ (5 ft³) capacity for a pilot scale test. Aqueous hydrogen peroxide, usually containing a diphosphonic acid, was pumped from drums through spray nozzles on each end of the blender. In all cases 70% $H_2O_2$ solution was used.

Temperature was measured at three points in the reaction mixture using thermocouples, and was controlled by varying the peroxide feed rate. Cooling was provided either by water in the blender jacket or using air flow above or through the bed. Solids leaving the blender with the air stream were trapped in a Venturi scrubber and the resulting solution analyzed for material balance purposes.

The heat balance was carefully controlled using the same procedure for all the runs:
Start the blender.
Charge a pre-weighed amount of soda ash.
Start air or cooling water.
Feed $H_2O_2$ solution until the desired weight is added.
Allow the product to cool about one hour before discharging through the bottom valve.

Stability was determined by storing 0.14 m³ fiber drums of product in a hot room at 50° C./20% RH and measuring active oxygen loss after 19 days. The product was exposed in the drum, and a loose fitting lid with no clamp was kept on top.

A summary of results is presented as Table VIII. In all cases, peroxide efficiency was 95+% after addition.

It is clear that a ratio of 1 or more moles of sodium carbonate per mole of available water is critical for a stable product.

TABLE I

SAPC STABILITY VS $H_2O_2$ CONCENTRATION HUMIDITY TEST

| INITIAL % $H_2O_2$ ASSAY | SAPC (UNSTABILIZED) % $H_2O_2$ LOSS | SAPC (STABILIZED) % $H_2O_2$ LOSS |
| --- | --- | --- |
| 15 | 17.40 | 5.20 |
| 18 | 22.03 | 3.20 |
| 20 | 21.98 | 2.51 |
| 22 | 16.43 | 5.65 |
| 24 | 19.02 | 4.53 |
| 28 | 26.64 | 7.13 |

TABLE II

SODA ASH PEROXYGEN CARRIER
HUMIDITY TEST 40° C. 80% R.H.
INITIAL $H_2O_2$ CONCENTRATION 18%

| TIME (DAYS) | % HYDROGEN PEROXIDE REMAINING |
| --- | --- |
| 1 | 100.0 |
| 2 | 100.0 |

TABLE II-continued

SODA ASH PEROXYGEN CARRIER HUMIDITY TEST 40° C. 80% R.H. INITIAL H₂O₂ CONCENTRATION 18%

| TIME (DAYS) | % HYDROGEN PEROXIDE REMAINING |
|---|---|
| 3 | 100.0 |
| 5 | 99.5 |
| 8 | 98.6 |
| 10 | 98.6 |

TABLE III

SODA ASH PEROXYGEN CARRIER STORAGE STABILITY

| 50 Deg. C. 40% R.H. TIME (DAYS) | % HYDROGEN PEROXIDE REMAINING |
|---|---|
| 11 | 98.4 |
| 18 | 99.8 |
| 25 | 97.1 |
| 32 | 99.8 |

TABLE IV

COMPARATIVE STABILITY OF SAPC WITH SODIUM PERBORATE

| 40 Deg. 80% R.H. COMPOSITION | % HYDROGEN PEROXIDE REMAINING |
|---|---|
| SAPC | 96.5 |
| SAPC (no diphosphonic acid) | 16.5 |
| Sodium Perborate Monohydrate | 97.6 |
| Sodium Perborate Tetrahydrate | 96.1 |
| Commercial Sodium Carbonate Peroxide (Coated) | 97.0 |

TABLE V

SAPC HYDRATE CONVERSION AT 40 Deg. C. 80 R.H.

| TIME (DAYS) | % BY WEIGHT DECAHYDRATE | MONO-HYDRATE | MONO/DEC RATIO |
|---|---|---|---|
| 0 | 4.46 | 3.39 | 0.76 |
| 1 | 2.58 | 5.56 | 2.16 |
| 2 | 1.23 | 6.12 | 4.98 |
| 3 | 0.55 | 6.71 | 12.20 |
| 6 | 0.24 | 6.83 | 16.71 |

TABLE VI

SAPC STABILITY VS. DIPHOSPHONIC ACID CONCENTRATION

40 Deg. 80% R.H.
10 DAYS
18% HYDROGEN PEROXIDE

| % DIPHOSPHONIC ACID | % HYDROGEN PEROXIDE REMAINING |
|---|---|
| 0.2 | 81.2 |
| 0.7 | 92.5 |
| 1.3 | 95.9 |

TABLE VII

EFFECT OF PARTICLE SIZE ON HYDROGEN PEROXIDE UP-TAKE

| SIEVE SIZE μm | WT. % SODA ASH | WT % HYDROGEN PEROXIDE IN SODA ASH FRACTION |
|---|---|---|
| 425 | 8.99 | 15.29 |
| 212 | 58.69 | 17.61 |
| 150 | 19.80 | 20.33 |
| 75 | 11.90 | 24.02 |
| 53 | 0.52 | 26.03 |
| <53 | 0.10 | 25.92 |

TABLE VIII

SAPC PILOT TEST - RIBBON BLENDER

| Run | Bulk Density g/ml | Bed Temp. °C. | Cooling | Product H₂O₂ wt % | % H | H₂O wt % | % H | Total Atomic % H | Na₂CO₃ at wt % | % Na | Na/H | Diphosphonic Acid % | % H₂O₂ Lost 19 Days |
|---|---|---|---|---|---|---|---|---|---|---|---|---|---|
| 1 | 0.77 | 41 | Jacket | 18.22 | 1.07 | 8.08 | 0.90 | 1.97 | 73.38 | 1.38 | 0.70 | 0.32 | 100* |
| 2 | 0.95 | 39 | Jacket | 23.00 | 1.35 | 9.47 | 1.05 | 2.40 | 67.12 | 1.27 | 0.53 | 0.41 | 100* |
| 3 | 0.77 | 43 | Jacket and air over | 22.63 | 1.33 | 5.42 | 0.60 | 1.93 | 71.39 | 1.35 | 0.70 | 0.56 | 100* |
| 4 | 0.95 | 42 | air through | 20.77 | 1.22 | 1.81 | 0.20 | 1.42 | 76.87 | 1.45 | 1.02 | 0.55 | 10.2 |
| 5 | 1.06 | 45 | air through | 18.71 | 1.10 | 2.73 | 0.30 | 1.40 | 78.03 | 1.47 | 1.05 | 0.53 | 6.4 |
| 6 | 0.58 | 43 | air through | 17.67 | 1.04 | 5.54 | 0.62 | 1.66 | 76.26 | 1.45 | 0.87 | 0.53 | 20.3 |
| 7 | 0.77 | 49 | air through | 18.66 | 1.10 | 2.22 | 0.25 | 1.35 | 78.61 | 1.48 | 1.09 | 0.51 | no test |
| 8 | 0.77 | 55 | air through | 19.12 | 1.12 | 2.39 | 0.27 | 1.39 | 77.97 | 1.47 | 1.05 | 0.52 | 4.2 |
| 9 | 0.77 | 47 | air through | 31.01 | 1.82 | 1.88 | 0.21 | 2.03 | 66.41 | 1.25 | 0.62 | 0.70 | 100* |
| 10 | 0.77 | 45 | air over | 18.89 | 1.11 | 2.72 | 0.30 | 1.41 | 77.90 | 1.46 | 1.04 | 0.49 | 6.6 |
| 11 | 0.77 | 46 | air through | 17.26 | 1.02 | 7.50 | 0.83 | 1.85 | 75.24 | 1.41 | 0.76 | 0.0 | 100* |

*drum caked solidly

We claim:

1. A stabilized soda ash peroxygen carrier composition comrpising a "particulate solid", said particulate solid comprising sodium carbonate, between 45 percent and 75 percent sodium carbonate perhydrate and 0.1 percent to about 3 percent by weight of a diphosphonic acid or salt having a formula of

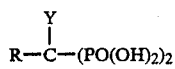

wherein Y is hydrogen or hydroxyl, R is hydrogen or an aliphatic hydrocarbon group having one to six carbons, sufficient sodium carbonate being present in the composition to provide between 1 and 5 moles of sodium carbonate for each mole of available water in the composition, said available water consisting essentially of water chemically available as hydrogen peroxide, water of crystallization and free water.

2. The composition of claim 1 wherein Y is hydroxyl, and R is methyl.